(12) United States Patent
Tischler

(10) Patent No.: US 7,020,741 B1
(45) Date of Patent: Mar. 28, 2006

(54) APPARATUS AND METHOD FOR ISOCHRONOUS ARBITRATION TO SCHEDULE MEMORY REFRESH REQUESTS

(75) Inventor: Brett A. Tischler, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 365 days.

(21) Appl. No.: 10/425,564

(22) Filed: Apr. 29, 2003

(51) Int. Cl.
*G06F 12/00* (2006.01)

(52) U.S. Cl. ........................ 711/106; 365/222
(58) Field of Classification Search ........ 711/104–106, 711/151, 158; 365/185.25, 222; 714/754; 710/113, 119, 309; 345/535; 370/461; 327/19
See application file for complete search history.

(56) References Cited

U.S. PATENT DOCUMENTS

| | | | |
|---|---|---|---|
| 6,167,484 A * | 12/2000 | Boyer et al. | ................. 711/106 |
| 6,286,083 B1 | 9/2001 | Chin et al. | |
| 6,741,515 B1 * | 5/2004 | Lazar et al. | ................. 365/222 |
| 2001/0010066 A1 | 7/2001 | Chin et al. | |
| 2002/0065981 A1 | 5/2002 | Jenne et al. | |

\* cited by examiner

Primary Examiner—Nasser Moazzami
(74) Attorney, Agent, or Firm—Toler, Larson & Abel LLP

(57) ABSTRACT

For use with a memory controller in a data processor that is capable of executing memory refresh requests to refresh a memory of the data processor, an apparatus and method is disclosed for scheduling execution of the memory refresh requests. The apparatus comprises a periodic memory refresh hint unit that is capable of sending to the memory controller a data signal that comprises a periodic memory refresh hint. The periodic memory refresh hint informs the memory controller of an optimal time for a memory refresh to occur. The memory controller may immediately execute a memory refresh request when it arrives or delay the execution of the memory refresh request until a more opportune time. This feature enables the memory controller to reduce memory access latency in scheduling memory transactions.

22 Claims, 5 Drawing Sheets

APPARATUS AND METHOD FOR ISOCHRONOUS ARBITRATION TO SCHEDULE MEMORY REFRESH REQUESTS

TECHNICAL FIELD OF THE INVENTION

The present invention is generally directed to data processors and, in particular, to a memory controller in a data processor that is capable of receiving and using periodic memory refresh hints to schedule the execution of memory refresh requests.

BACKGROUND OF THE INVENTION

In recent years, there have been great advancements in the speed, power, and complexity of integrated circuits, such as application specific integrated circuit (ASIC) chips, random access memory (RAM) chips, microprocessor (μP) chips, and the like. These advancements have made possible the development of system-on-a-chip (SOC) devices. An SOC device integrates into a single chip many of the components of a complex electronic system, such as a wireless receiver (i.e., cell phone, a television receiver, and the like). SOC devices greatly reduce the size, cost, and power consumption of the system.

System-on-a-chip (SOC) data processors are characterized by a very high degree of integration on a single integrated circuit (IC) chip. Many of the peripheral components now integrated onto the same IC chip as a processor core would have been implemented as separate IC chips in a previous generation of processors. Advantageously, this decreases the amount of board space required, reduces the effects of noise, allows for low-voltage operations, and, in many cases, reduces the pin count of the SOC device.

System-on-a-chip (SOC) devices comprise a plurality of individual modules that communicate with each other by sending data over one or more internal data buses. Many of the individual modules in a system-on-a-chip device function independently of each other. The independent functioning of the modules often causes the modules to simultaneously attempt to access memory through a memory controller of the system-on-a-chip device. The data bus that connects the modules to the memory controller is provided with a memory access arbiter unit to decide which memory request will be granted priority to the memory controller.

The arbitration scheme of a memory access arbiter unit may be either fixed or adaptive. In a fixed arbitration scheme the memory access priorities are not changed after they are assigned to each module. For example, in most types of fixed arbitration schemes the highest memory access priority is assigned to the central processing unit (CPU) module. Lower memory access priorities are then assigned to other modules of the computer system. Whenever the memory controller simultaneously receives two or more memory access requests the memory controller simply grants access to the module with the highest memory access priority. The memory access priorities remain fixed for each module.

In an adaptive arbitration scheme the memory access priorities may be changed after they are assigned to each module. An example of an adaptive arbitration scheme is set forth in U.S. Pat. No. 6,286,083. In an adaptive arbitration scheme, memory access requests that are refused service are adaptively assigned progressively higher priority rankings until they are granted service. As in the case of a fixed arbitration scheme, whenever the memory controller simultaneously receives two or more memory access requests the memory controller simply grants access to the module with the highest memory access priority. But in an adaptive arbitration scheme, the memory access priorities do not remain fixed for each module.

A system-on-a-chip device comprises a plurality of individual data streams to and from the individual modules of the device. There is therefore a need to provide an acceptable level of memory access latency. One contributor to variable memory access latency is caused by the execution of memory refresh requests. When a typical prior art memory controller receives a memory refresh request, the memory controller immediately executes the memory refresh request. The memory controller suspends the execution of all other memory transactions while the memory refresh request is being processed. The suspension of all other memory transactions causes unexpected delays and causes increased memory access latency.

Therefore, there is a need in the art for an apparatus and method that is capable of scheduling the execution of memory refresh requests to minimize memory access latency. In particular, there is a need in the art for improved system-on-a-chip (SOC) devices and other large-scale integrated circuits that have a memory controller that is capable of scheduling the execution of memory refresh requests to minimize memory access latency.

SUMMARY OF THE INVENTION

To address the above-discussed deficiencies of the prior art, it is a primary object of the present invention to provide a data processor having a memory controller that is capable of scheduling the execution of memory refresh requests to minimize memory access latency.

One advantageous embodiment of the present invention comprises a memory controller that is capable of receiving memory refresh requests from a memory refresh request unit. The memory controller is capable of executing the memory refresh requests in a memory access arbitration scheme to refresh a memory unit within the data processor. The present invention further comprises a periodic memory refresh hint unit that is capable of sending a data signal to the memory controller. The data signal comprises a periodic memory refresh hint that informs the memory controller of an optimal time for a memory refresh to occur.

When the memory controller receives a periodic memory refresh hint the memory controller may immediately execute a memory refresh request when it arrives or may delay the execution of a memory refresh request until a more opportune time. This feature enables the memory controller to reduce memory access latency in scheduling memory transactions.

It is an object of the present invention to provide an apparatus and method for creating a periodic memory refresh hint for a memory controller in a data processor that informs the memory controller of an optimal time for a memory refresh to occur.

It is also an object of the present invention to provide an apparatus and method for creating a periodic memory refresh hint for a memory controller in a data processor wherein the periodic memory refresh hint is an isochronous data signal.

It is another object of the present invention to provide a memory controller in a data processor that is capable of either immediately executing a memory refresh request when the memory refresh request is received or delaying the execution of the memory refresh request until a more opportune time.

It is still another object of the present invention to provide a memory controller in a data processor that is capable of delaying the execution of a memory refresh request until an occurrence of a time slice identified by a memory refresh hint.

It is also an object of the present invention to provide a memory controller in a data processor that is capable of delaying the execution of a memory refresh request until the memory controller receives a second data signal that represents a second memory refresh hint.

It is another object of the present invention to provide a periodic memory refresh hint unit in a data processor that is capable of providing memory refresh hints to a memory controller of the data processor to enable the memory controller to reduce memory access latency in scheduling memory transactions.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system-on-a-chip (SOC) device.

Figure 1:
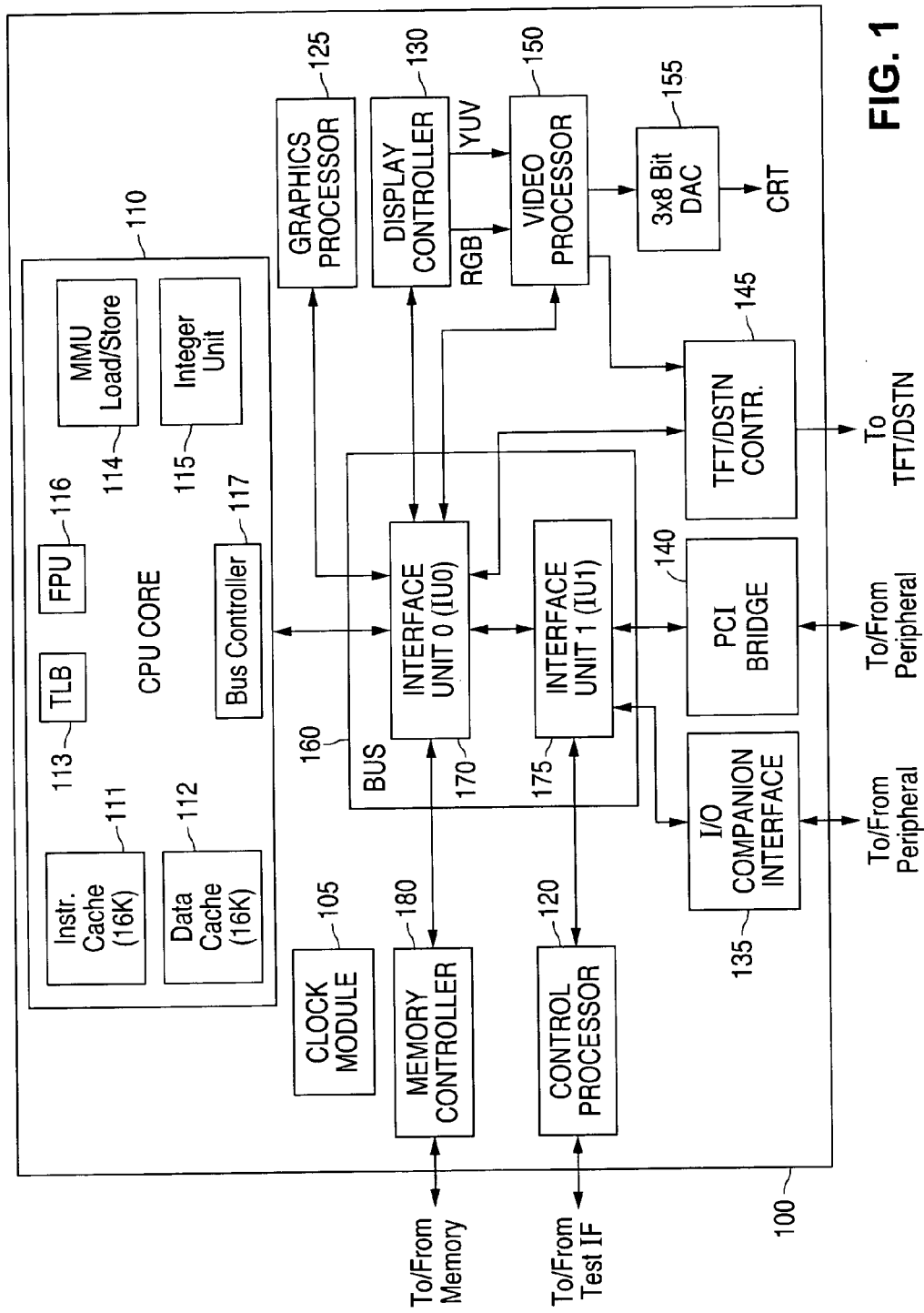
FIG. 1 illustrates an exemplary processing system according to an advantageous embodiment of the present invention.

FIG. 1 illustrates exemplary processing system 100 according to one embodiment of the present invention. In the exemplary embodiment, processing system 100 is a highly integrated system-on-a-chip (SOC) device designed to power information appliances (IA) for entertainment, educational, and/or business purposes. However, this is by way of illustration only and those skilled in the art will recognize that the present invention may be integrated into other types of SOC devices, such as cell phone transceivers, television receivers, radio receivers, and the like.

Processing system 100 comprises clock module 105, central processing unit (CPU) core 110, control processor 120, graphics processor 125, display controller 130, input/output (I/O) companion interface (IF) 135, peripheral component interconnect (PCI) bridge 140, TFT/DSTN controller 145, video processor 150, three (3)×eight (8) bit digital to analog converter (DAC) 155, internal bus 160, and memory controller 180.

CPU core 110 comprises instruction cache 111, data cache 112, translation look-aside buffer (TLB) 113, memory management unit (MMU) load/store block 114, integer unit (IU) 115, floating point unit (FPU) 116, and bus controller 117. According to an exemplary embodiment of the present invention, instruction cache 111 is sixteen (16) kilobytes and data cache 112 is sixteen (16) kilobytes. Internal bus 160 comprises interface unit 0 (IU0) 170 and interface unit 1 (IU1) 175.

According to an exemplary embodiment of the present invention, CPU core 110 is an x86 compatible device and FPU 116 is an x87 compatible device. The instruction set supported by CPU core 110 may be a combination of the instruction sets implemented by the Intel Pentium™ processor, the AMD™ K6 and K7 processors, and the National Semiconductor Corporation™ (NSC) GX1 processor.

Integer unit 115 comprises an instruction pipeline and associated logic. According to an exemplary embodiment, integer unit 115 consists of a single-issue eight-stage pipeline. The eight stages of the instruction pipeline in integer unit 115 are:

1) Instruction Pre-fetch stage;
2) Instruction Pre-decode stage;
3) Instruction Decode stage;
4) Instruction Queue stage;
5) Address Calculation 1 stage;
6) Address Calculation 2 stage;
7) Execution Unit stage; and
8) Writeback stage.

In the Instruction Pre-fetch stage, the raw instruction is fetched from the instruction memory cache. The Instruction Pre-decode stage extracts prefix bytes from the raw instruction bits. The pre-decode operation looks-ahead to the next instruction and a potential bubble can be eliminated if the pipeline stalls downstream. The Instruction Decode stage performs full decode of the instruction data and indicates the instruction length back to the Pre-fetch stage, thereby allowing the Pre-fetch stage to shift the appropriate number of bytes to the beginning of the next instruction.

The Instruction Queue stage comprises a FIFO containing decoded x86 instructions. The Instruction Queue allows the Instruction Decode stage to proceed even if the pipeline is stalled downstream. Register read operations for data operand address calculations are performed in the Instruction Queue stage. The Address Calculation 1 stage computes the linear address of operand data (if required) and issues requests to data cache 112. Microcode can take over the pipeline and inject a micro-box if multi-box instructions require additional data operands. In Address Calculation 2 stage, operand data (if required) is returned and set up to the Execution Unit stage with no bubbles if there was a data cache hit. Segment limit checking also is performed on the data operand address. The micro-read-only-memory (μROM) is read for setup to Execution Unit stage.

In the Execution Unit stage, register and/or data memory fetches are fed through the Arithmetic Logic Unit (ALU) for arithmetic or logical operations. The μROM always fires for the first instruction box into the pipeline. Microcode may control the pipeline and insert additional boxes in the Execution Unit stage if the instruction requires multiple Execution Unit stages to complete. The Writeback stage writes results of the Execution Unit stages to the register file or to data memory.

The memory subsystem of CPU core 110 supplies integer unit 115 pipeline with instructions, data, and translated addresses. To support efficient delivery of instructions, the memory subsystem uses instruction cache 111 and TLB 113. According to an exemplary embodiment of the present invention instruction cache 111 may be a single clock access, sixteen kilobyte (16 KB), four (4) way set associative cache and TLB 113 may be an eight (8) entry, fully associative, translation look-aside buffer for data and an eight (8) entry, fully associative, translation look-aside buffer for instructions. TLB 113 performs necessary address translations when in protected mode.

TLB 113 may also comprise a second-level (L2) unified (instruction and data), sixty four (64) entry, two (2) way set associative TLB that is accessed when there is a miss to the instruction TLB or the data TLB. The L2 unified TLB takes an additional clock to access. When there is a miss to the instruction or data caches or the TLB, the access must go to memory controller 180 for processing. The use of instruction cache 111, data cache 112 and their associated TLB in TLB 113 improves the overall efficiency of integer unit 115 by enabling simultaneous access to both instruction cache 111 and data cache 112.

Floating-point unit (FPU) 116 is a pipelined arithmetic unit that performs floating-point operations in accordance with the IEEE 754 standard. FPU 116 is a pipelined machine with dynamic scheduling of instructions to minimize stalls due to data dependencies. FPU 116 performs out-of-order execution and register renaming. FPU 116 is designed to support an instruction issue rate of one instruction per clock from the integer core. The data path is optimized for single precision arithmetic. Extended precision instructions are handled in microcode and require multiple passes through the pipeline. According to an exemplary embodiment, FPU 116 comprises an execution pipeline and a load/store pipeline, thereby enabling load/store operations to execute in parallel with arithmetic instructions.

Control processor 120 is responsible for reset control, macro-clock management, and debug support provided in processing system 100. Control processor 120 comprises a JTAG interface and the scan chain control logic. Control processor 120 supports chip reset, which includes initial phase-locked loop (PLL) control and programming, and runtime power management macro-clock control. The JTAG support includes a TAP controller that is IEEE 1149.1 compliant. CPU control can be obtained through the JTAG interface into the TAP Controller, and all internal registers, including CPU core 110 registers, may be accessed. In-circuit emulation (ICE) capabilities are supported through the JTAG and TAP Controller interface.

As noted above, internal bus 160 comprises two interface units: IU0 170 and IU1 175. IU0 170 connects six (6) high-speed modules together with a seventh link to IU1 175. IU1 175 connects to three (3) low-speed modules, namely I/O companion IF 135, PCI bridge 140, and TFT/DSTN controller 145.

Memory controller 180 is the memory source for all memory accesses in processing system 100. Memory controller 180 supports a memory data bus width of sixty four (64) bits. Memory controller 180 supports two types of memory. The first type of memory is a 111 MHz 222 MT/S for DDR (Dual Data Rate). The second type of memory is a 133 MHz for SDR (Single Data Rate). Memory controller 180 supports up to one gigabyte (1 GB) of either SDR memory or DDR memory.

The modules that need access to memory are CPU core 110, graphics processor 125, display controller 130, and TFT/DSTN controller 145. Because memory controller 180 supports memory needs for both CPU core 110 and the display subsystem, memory controller 180 is classically referred to as a Unified Memory Architecture (UMA) memory subsystem. According to an exemplary embodiment of the present invention, graphics processor 125 is a BitBLT/vector engine that supports pattern generation, source expansion, pattern/source transparency, and 256 ternary raster operations.

Display controller 130 performs the following functions: 1) retrieval of graphics, video, and overlay streams from the frame buffer; 2) serialization of the streams; 3) any necessary color look-ups and output formatting; and 4) interfacing with the display filter for driving the display device(s) (not shown). Display controller 130 may comprise a graphical user interface (GUI) and a VGA, which provides full hardware compatibility with the VGA graphics standard. The VGA passes eight (8) bit pixels and sync signals to the GUI, which expands the pixels to twenty four (24) BPP via the color lookup table and passes the information to video processor 150. Video processor 150 ultimately generates the digital red, green, and blue signals and buffers the sync signals, which are then sent to DAC 155 or the flat panel interface.

Video processor 150 mixes the graphics and video streams, and outputs digital RGB data to DAC 155 or the flat panel interface, depending upon the part (i.e., cathode ray tube (CRT) or flat panel (FP)). Video processor 150 is capable of delivering high resolution and true color graphics. Video processor 150 may also overlay or blend a scaled true color video image on the graphics background.

TFT/DSTN controller 145 converts the digital RGB output of a video mixer block to the digital output suitable for driving a dual-scan color STN (DSTN) flat panel LCD. TFT/DSTN controller 145 connects to the digital RGB output of video processor 150 and drives the graphics data onto a dual-scan flat panel LCD. According to an exemplary embodiment, TFT/DSTN controller 145 may drive all standard dual-scan color STN flat panels up to 1024×768 resolution.

PCI bridge 140 contains all the necessary logic to support a standard external PCI interface. The PCI interface is PCI 2.2 specification compliant. PCI bridge 140 comprises the PCI and Interface Unit control, read and write FIFOs, and a PCI arbiter. I/O companion IF 135 handles several unique signals that support system reset, system interrupts, and power system managements.

Figure 2:
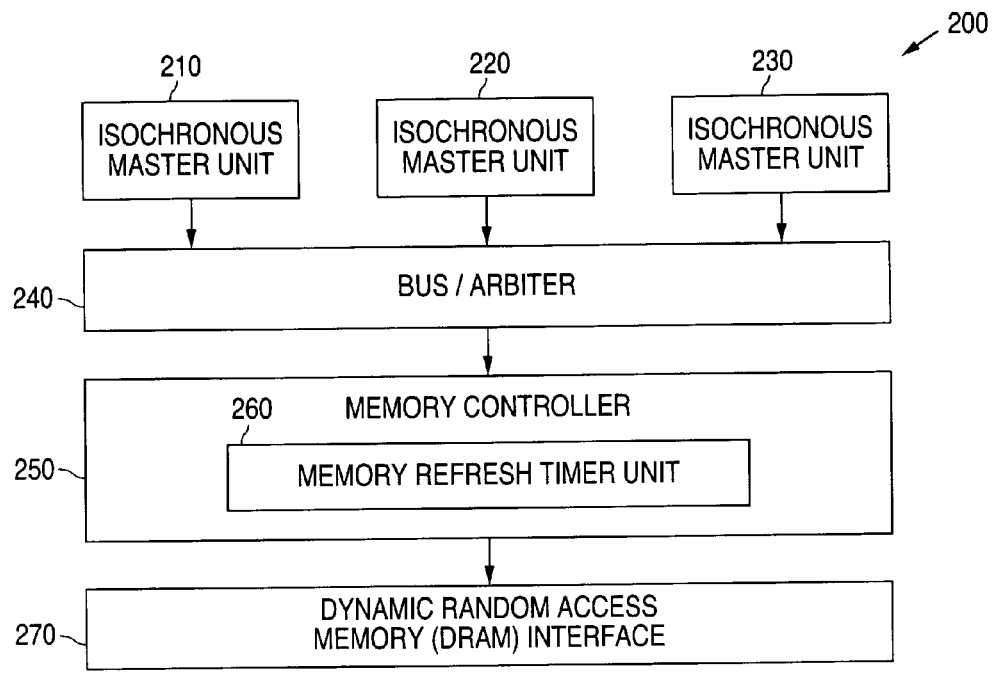
FIG. 2 illustrates a prior art data bus system comprising a prior art memory controller, a prior art memory access data bus and a prior art memory access arbiter.

FIG. 2 illustrates an exemplary prior art data bus system 200. Data bus system 200 comprises three prior art isochronous master units, 210, 220 and 230. The number three is merely an example. Data bus system 200 may generally comprise more than three or fewer than three isochronous master units. The isochronous master units, 210, 220 and 230, are coupled to a unit 240 that comprises a memory data bus and a memory access arbiter unit. For purposes of explanation, it is not necessary to go into detail concerning the structure and operation of the memory data bus/memory access arbiter unit 240. The structure and operation of the memory data bus and the memory access arbiter are well known in the art. The output of memory data bus/memory access arbiter unit 240 is coupled to an input of memory controller 250. As shown in FIG. 2, memory controller 250 comprises a memory refresh timer unit 260. The output of memory controller 250 is coupled to a dynamic random access memory (DRAM) interface 270.

Isochronous master units 210, 220 and 230, each send memory access requests to memory controller 250 through memory data bus/memory access arbiter unit 240. The memory access arbiter unit decides the priority of memory access when two or more of the isochronous master units 210, 220 and 230 simultaneously send a memory access request to memory controller 250.

Memory refresh timer unit 260 in memory controller 250 periodically sends memory refresh requests to memory controller 250 to execute a memory refresh process for a memory unit (not shown in FIG. 2). In prior art data bus system 200 the memory controller 250 always immediately executes a memory refresh request whenever it is received. Memory controller 250 suspends the execution of all other memory transactions while the memory refresh request is being processed. The suspension of all other memory transactions causes unexpected delays and causes increased memory access latency. The increase in memory access latency may be clearly seen with reference to FIG. 3.

Figure 3:
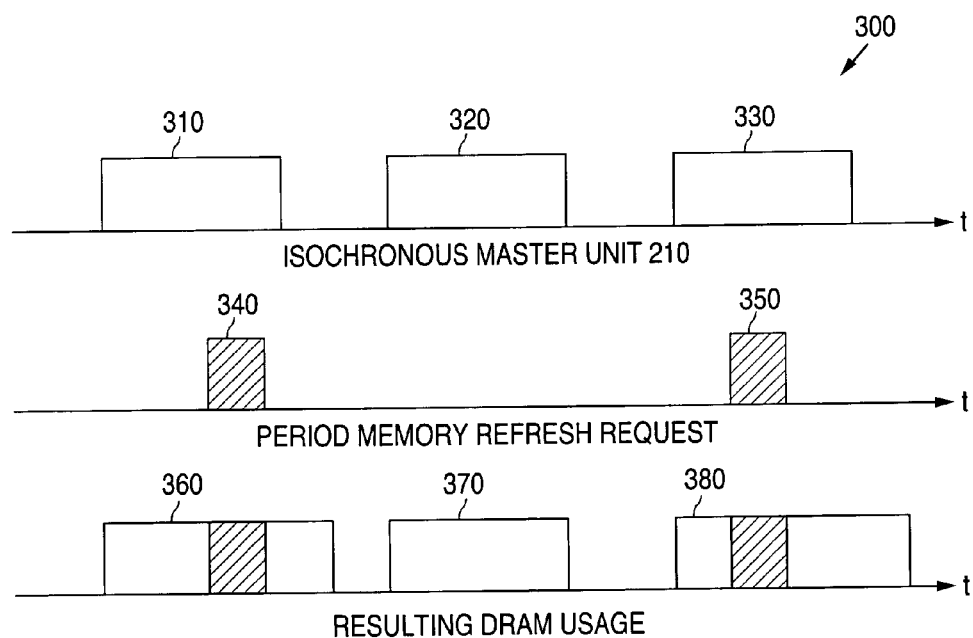
FIG. 3 illustrates waveform diagrams for a prior art data bus system showing waveforms with respect to time of the output of an isochronous master unit, periodic memory refresh requests, and the resulting DRAM usage.

FIG. 3 illustrates waveform diagrams for prior art data bus system 200. FIG. 3 shows a waveform with respect to time of the output of exemplary isochronous master unit 210. FIG. 3 also shows a waveform with respect to time of the output of the periodic memory refresh requests of memory refresh timer unit 260. FIG. 3 also shows a waveform of the resulting usage of dynamic random access memory (DRAM). The axis of each waveform in FIG. 3 is an axis that represents the passage of time. A letter "t" at the right hand side of each axis indicates that each axis represents a time axis.

The output of isochronous master unit 210 is shown in the first time axis. The output comprises three rectangular wave pulses 310, 320 and 330. The output of memory refresh timer unit 260 is shown in the second time axis. The output comprises two rectangular wave pulses, 340 and 350. The interior portions of rectangular wave pulses, 340 and 350, are shown as shaded portions.

Consider the third time axis in FIG. 3 that shows the resulting usage of dynamic random access memory (DRAM). The output comprises three rectangular wave pulses, 360, 370 and 380. Rectangular wave pulse 360 illustrates the effect of the immediate execution by memory controller 250 of the memory refresh request 340. It is seen that the leading edge of waveform 310 and leading edge of waveform 360 occur at the same time. The shaded portion of waveform 360 represents the time during which memory controller 250 is executing the memory refresh request 340. The delay caused by the execution of memory refresh request 340 causes the trailing edge of waveform 360 to occur later than it would otherwise have occurred if memory refresh request 340 had not been executed immediately. The execution of memory refresh request 340, in essence, interrupted and delayed the memory usage requested by waveform 310 of isochronous master unit 210. Because there was no intervening memory refresh request during the time of waveform 320 the memory usage requested by waveform 320 was not interrupted. This is shown in waveform 370.

As seen in FIG. 3, the immediate execution of memory refresh request 350 similarly interrupted and delayed the memory usage requested by waveform 330 of isochronous master unit 210. It is seen that the leading edge of waveform 330 and leading edge of waveform 380 occur at the same time. The shaded portion of waveform 380 represents the time during which memory controller 250 is executing the memory refresh request 350. The delay caused by the execution of memory refresh request 350 causes the trailing edge of waveform 380 to occur later than it would otherwise have occurred if memory refresh request 350 had not been executed.

Memory controller 250 delays the completion of memory transaction 360 during the execution of memory refresh request 340. This causes an unexpected delay in the execution of memory transaction 360. Similarly, memory controller 250 delays the completion of memory transaction 380 during the execution of memory refresh request 350. This causes an unexpected delay in the execution of memory transaction 380. The memory refresh requests, 340 and 350, are not synchronized with respect to the memory requests, 310, 320 and 330, of isochronous master unit 210. This causes prior art data bus system 200 to experience increased memory access latency.

As will be more fully described, the present invention solves this problem by scheduling the execution of the memory refresh process in the memory access arbitration scheme. Examples of isochronous data streams include display update data signals and video update data signals. The present invention provides a data signal that comprises a periodic memory refresh hint and treats it as an additional isochronous data stream in the memory access arbitration scheme. The memory access arbitration scheme sets up time slices for all of the isochronous data streams. In the present invention the periodic memory refresh hint data signal is treated as one of the isochronous data streams of the system.

The memory access arbiter unit of the present invention sends a memory refresh hint to the memory controller when a time slice for a memory refresh is to occur. The memory controller then decides to execute a memory refresh process during that time slice or wait for the next memory refresh hint to occur. This approach allows modules that need deterministic or isochronous latency to be more easily scheduled. This approach also reduces memory access latency.

Figure 4:
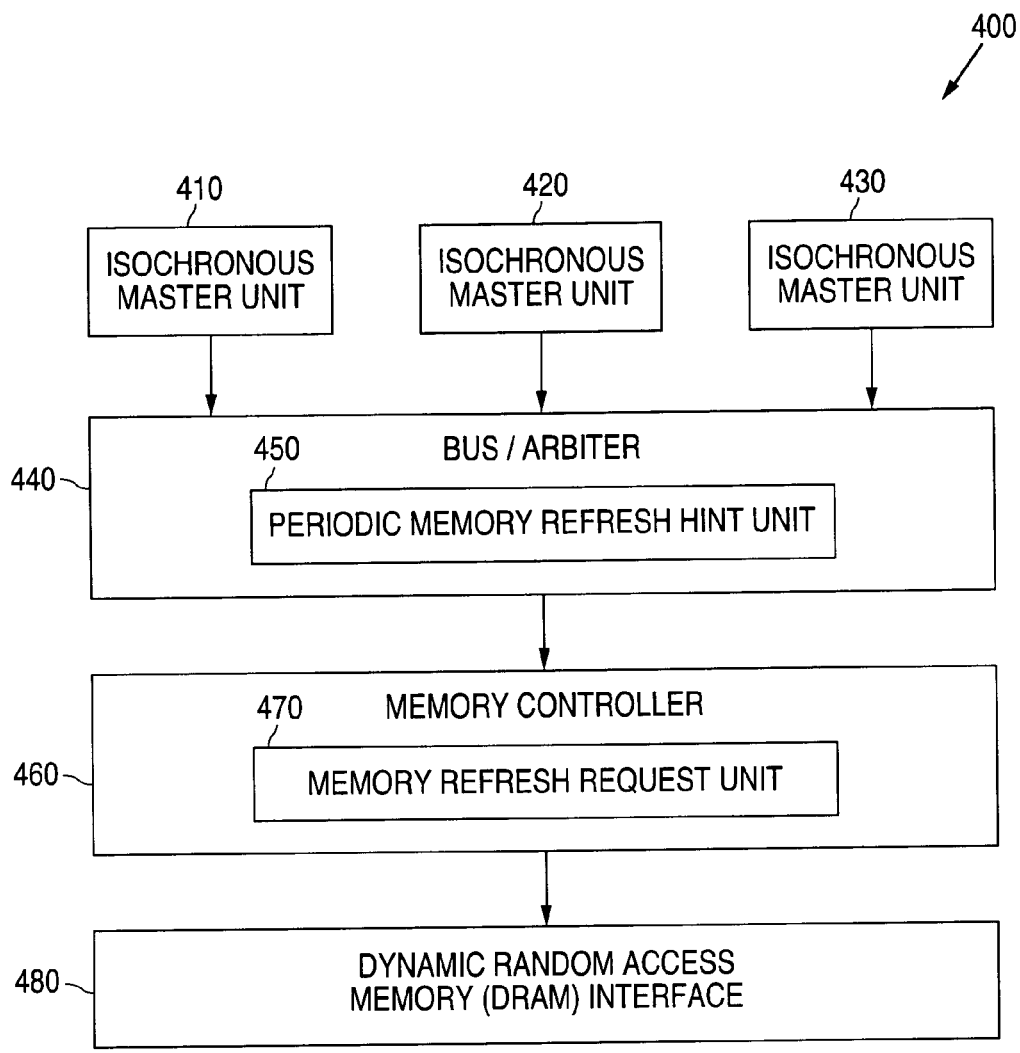
FIG. 4 illustrates an advantageous embodiment of the present invention comprising a data bus system comprising a memory controller, a memory access data bus and a memory access arbiter that comprises a periodic memory refresh hint unit.

FIG. 4 illustrates an advantageous embodiment of a data bus system 400 of the present invention. Data bus system 400 comprises three isochronous master units, 410, 420 and 430. The number three is merely an example. Data bus system 400 may generally comprise more than three or fewer than three isochronous master units. The isochronous master units, 410, 420 and 430, are coupled to a unit 440 that comprises a memory data bus and a memory access arbiter unit. For purposes of explanation, it is not necessary to go into detail concerning the structure and operation of the memory data bus/memory access arbiter unit 440. The structure and operation of the memory data bus and the memory access arbiter are well known in the art. The output of memory data bus/memory access arbiter unit 440 is coupled to an input of memory controller 460. As shown in FIG. 4, memory controller 460 comprises a memory refresh request unit 470. The output of memory controller 460 is coupled to a dynamic random access memory (DRAM) interface 480.

Memory data bus/memory access arbiter unit 440 also comprises periodic memory refresh hint unit 450. Periodic memory refresh hint unit 450 generates and sends a memory refresh hint to memory controller 460 to alert memory controller 460 to an impending occurrence of a memory refresh request.

Isochronous master units 410, 420 and 430, each send memory access requests to memory controller 460 through memory data bus/memory access arbiter unit 440. The memory access arbiter unit decides the priority of memory access when two or more of the isochronous master units 410, 420 and 430 simultaneously send a memory access request to memory controller 460.

Memory refresh request unit 470 in memory controller 460 sends memory refresh requests to memory controller 460 to execute a memory refresh process for a memory unit (not shown in FIG. 4). In data bus system 400 memory controller 460 does not necessarily immediately execute each memory refresh request as it is received. Before the arrival of a memory refresh request, memory controller 460 has already received a memory refresh hint from periodic memory refresh hint unit 450. Memory controller 460 is able to make a determination whether to immediately execute a memory refresh request or to delay the execution of the memory refresh request. Memory controller 460 may wait for the next memory refresh hint to occur before memory controller 460 executes the memory refresh request. This feature allows memory controller 460 to delay the execution of a memory refresh request until a more opportune time. This feature provides for more flexibility in scheduling memory transactions and reduces memory access latency. The reduction in memory access latency may be clearly seen with reference to FIG. 5.

Figure 5:
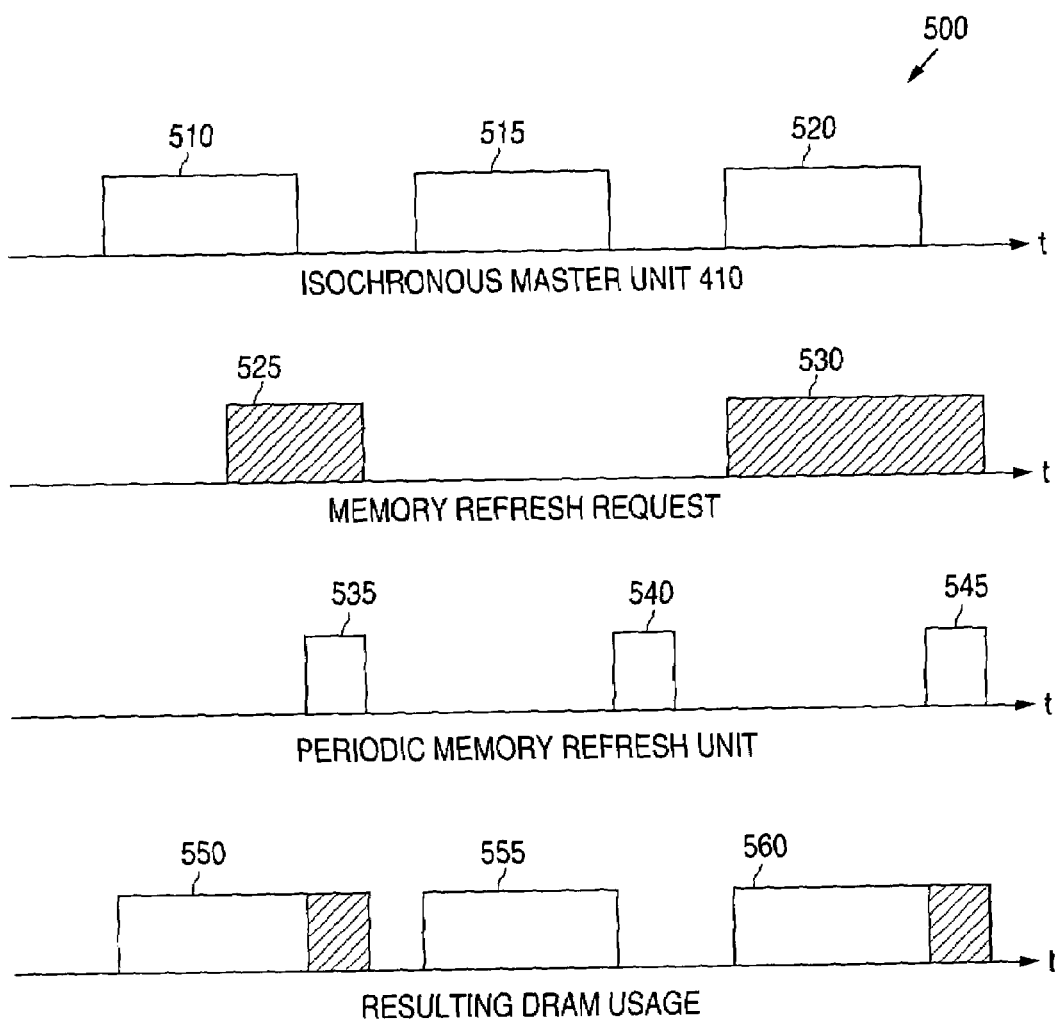
FIG. 5 illustrates waveform diagrams for a data bus system of the present invention showing waveforms with respect to time of the output of an isochronous master unit, memory refresh requests, periodic memory refresh hints, and the resulting DRAM usage.

FIG. 5 illustrates waveform diagrams for data bus system 400 of the present invention. FIG. 5 shows a waveform with respect to time of the output of exemplary isochronous master unit 410. FIG. 5 also shows a waveform with respect to time of the output of the memory refresh requests of memory refresh request unit 470. FIG. 5 also shows a waveform with respect to time of the output of the periodic memory refresh hints of periodic memory refresh hint unit 450. FIG. 5 also shows a waveform of the resulting usage of dynamic random access memory (DRAM). The axis of each waveform in FIG. 5 is an axis that represents the passage of time. A letter "t" at the right hand side of each axis indicates that each axis represents a time axis.

The output of isochronous master unit 410 is shown in the first time axis. The output comprises three rectangular wave pulses 510, 515 and 520. The output of memory refresh request unit 470 is shown in the second time axis. The output comprises two rectangular shaded wave pulses, 525 and 530. The output of periodic memory refresh hint unit 450 is shown in the third time axis. The output comprises three rectangular wave pulses, 535, 540 and 545.

Consider the fourth time axis in FIG. 5 that shows the resulting usage of dynamic random access memory (DRAM). The output comprises three rectangular wave pulses, 550, 555 and 560. Rectangular wave pulse 550 illustrates the effect of memory refresh hint 535 on memory request refresh request 525 of memory controller 460. It is seen that the leading edge of waveform 510 and leading edge of waveform 550 occur at the same time. The shaded portion of waveform 550 represents the time during which memory controller 460 is executing the memory refresh request 525. Memory refresh request 525 is executed during the periodic memory refresh hint 535. The execution of memory refresh request 525 did not interrupt or delay the memory usage requested by waveform 510 of isochronous master unit 410. Memory controller 460 executed memory refresh request 555 in its appropriate time slice as indicated by periodic memory refresh hint 535. Memory controller 460 also had the option to not execute memory refresh request 525 during the time slice and wait for the next memory refresh hint from periodic memory refresh hint unit 450.

As seen in FIG. 5, the execution of memory refresh request 530 was similarly delayed until the non-shaded portion of waveform 560 was completed. The execution of memory refresh request 530 did not interrupt or delay the memory usage requested by waveform 520 of isochronous master unit 410. Memory controller 460 executed memory refresh request 530 in its appropriate time slice as indicated by periodic memory refresh hint 545. Memory controller 460 also had the option to not execute memory refresh request 530 during the time slice and wait for the next memory refresh hint from periodic memory refresh hint unit 450.

As shown in FIG. 5, there was no memory refresh request during the time between memory refresh request 525 and memory refresh request 530. Therefore the memory usage requested by waveform 515 was not interrupted. This is shown in waveform 555.

Figure 6:
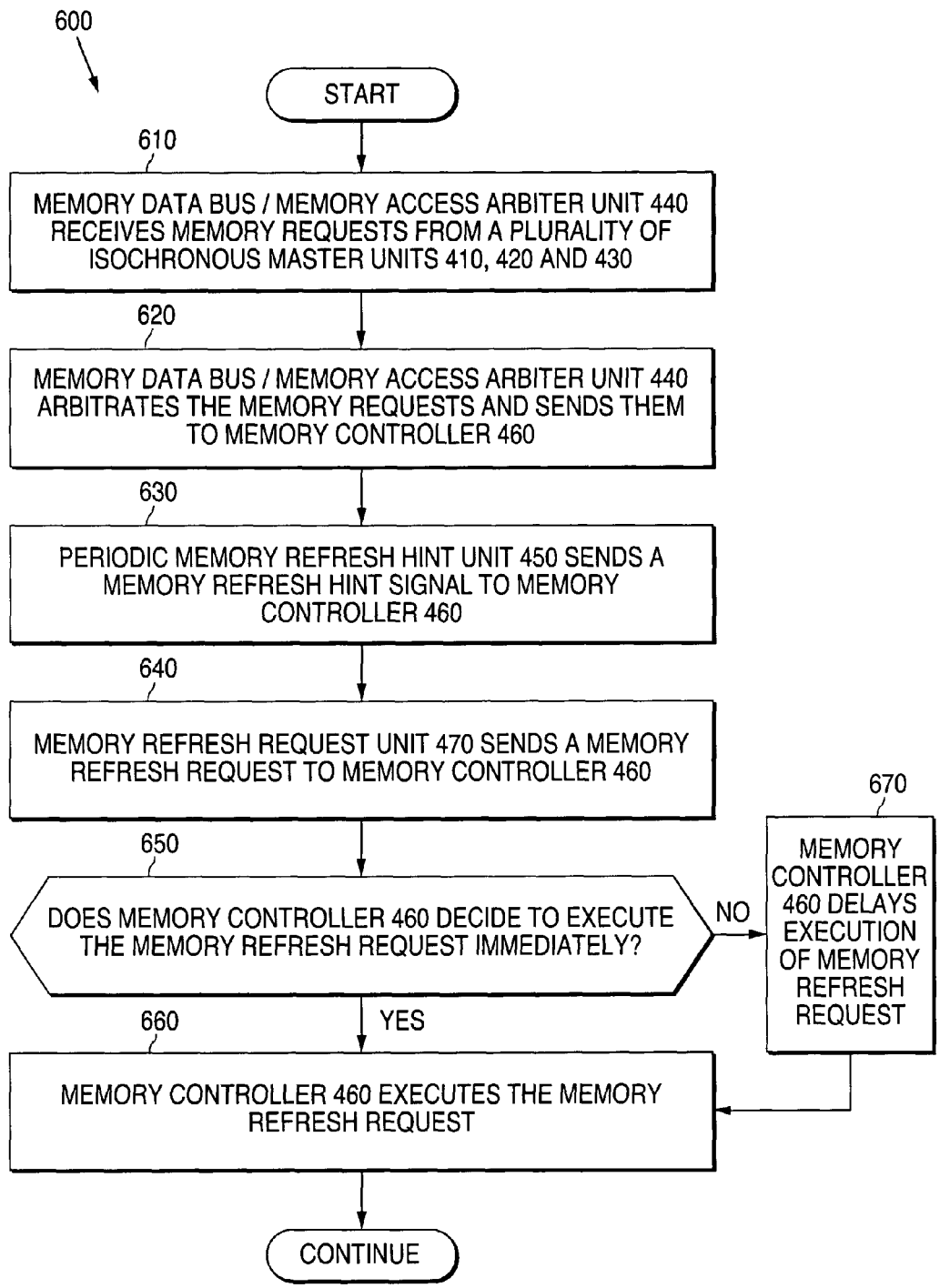
FIG. 6 illustrates a flow chart showing the operation of an advantageous embodiment of a method of the present invention.

FIG. 6 illustrates a flow chart showing the operation of an advantageous embodiment of a method of the present invention for providing a memory refresh hint signal to memory controller 460. The steps of the method shown in FIG. 6 are generally denoted with reference numeral 600.

Memory data bus/memory access arbiter unit 440 receives memory requests from a plurality of isochronous master units 410, 420 and 430 (step 610). Memory data bus/ memory access arbiter unit 440 arbitrates the memory requests and sends them to memory controller 460 (step 620). Periodic memory refresh hint unit 450 in memory data bus/memory access arbiter unit 440 sends a periodic memory refresh hint signal to memory controller 460. The memory refresh hint signal informs memory controller 460 of an optimal time for a memory refresh to occur (step 630).

Memory refresh request unit 470 in memory controller 460 then sends a memory refresh request to memory controller 460 (step 640). When memory controller 460 receives the memory refresh request from memory refresh request unit 470 memory controller 460 makes a determination whether to execute the memory refresh request immediately (decision step 650). If memory controller 460 decides to execute the memory refresh request immediately, then control passes to step 660 where the memory refresh request is executed (step 660). If memory controller 460 decides not to execute the memory refresh request immediately, then control passes to step 670 where the execution of the memory refresh request is delayed (step 670). Memory controller 460 determines the length of the delay. Memory controller 460 may delay the execution of the memory refresh request until the arrival of the next memory refresh hint from periodic memory refresh hint unit 450. After the period of delay has expired, control passes to step 660 and memory controller 460 executes the memory refresh request (step 660).

Although the present invention has been described with an exemplary embodiment, various changes and modifications may be suggested to one skilled in the art. It is intended that the present invention encompass such changes and modifications as fall within the scope of the appended claims.

What is claimed is:

1. An apparatus, comprising;
   a memory refresh request unit including an output to provide memory refresh requests;
   a memory controller including an input to receive said memory refresh requests, wherein the memory controller refreshes the memory by executing the memory refresh requests; and
   a periodic memory refresh hint unit including an output to send to said memory controller a data signal that comprises a periodic memory refresh hint that informs said memory controller of an optimal time for a memory refresh to occur.

2. The apparatus as set forth in claim 1 wherein said data signal that comprises said periodic memory refresh hint is an isochronous data signal.

3. The apparatus as set forth in claim 1 wherein said memory controller, in response to receiving said data signal that comprises said periodic memory refresh hint, determines whether to one of; immediately execute said memory refresh request when said memory controller receives said memory refresh request and delay an execution of said memory refresh request.

4. The apparatus as set forth in claim 3 wherein said memory controller delays an execution of said memory refresh request until an occurrence of a time slice identified by said data signal that comprises said memory refresh hint.

5. The apparatus as set forth in claim 3 wherein said memory controller delays an execution of said memory refresh request until said memory controller receives a second data signal that comprises a second memory refresh hint.

6. The apparatus as set forth in claim 1 wherein said periodic memory refresh hint unit is located within a bus arbiter coupled to said memory controller.

7. The apparatus as set forth in claim 3 wherein said memory controller schedules memory refresh requests to reduce memory access latency in scheduling memory transactions.

8. The apparatus as set forth in claim 1, further comprising:
   a fist master unit that accesses a bus at a first time, wherein the optimal time is a second time mutually exclusive of the first time.

9. A data processor comprising:
   a memory;
   a memory refresh request unit;
   a memory controller including an input to receive memory refresh requests from said memory refresh request unit wherein said memory controller executes said memory refresh requests to refresh said memory; and
   a periodic memory refresh hint unit including an output to send to said memory controller a data signal that comprises a periodic memory refresh hint that informs said memory controller of an optimal time for a memory refresh to occur.

10. The data processor as set forth in claim 9 wherein said data signal that comprises said periodic memory refresh hint is an isochronous data signal.

11. The data processor as set forth in claim 9 wherein said memory controller, in response to receiving said data signal that comprises said periodic memory refresh hint, is determines whether to one of
   immediately execute said memory refresh request when said memory controller receives said memory refresh request and delay an execution of said memory refresh request.

12. The data processor as set forth in claim 11 wherein said memory delays an execution of said memory fresh request until an occurrence of a time slice identified by said data signal that comprises said memory refresh hint.

13. The data processor as set forth in claim 11 wherein said memory controller is delays an execution of said memory refresh request until said memory controller receives a second data signal that comprises a second memory refresh hint.

14. The data processor as set forth in claim 9 wherein said periodic memory refresh hint unit is located within a bus arbiter coupled to said memory controller.

15. The data processor as set forth in claim 11 wherein said memory controller schedules memory refresh requests to reduce memory access latency in scheduling memory transactions.

16. A method for scheduling execution of memory refresh requests in a memory access arbitration scheme, wherein said method comprises:
   receiving a memory refresh request at said memory controller; and
   receiving at said memory controller a data signal that comprises a periodic memory refresh hint wherein said data signal informs said memory controller of an optimal time for a memory refresh to occur.

17. The method as set forth in claim 16 wherein said data signal that comprises said periodic memory refresh hint is an isochronous data signal in said memory access arbitration scheme.

18. The method as set forth in claim 16 further comprising:
   receiving in said memory controller said data signal that comprises said periodic memory refresh hint;
   determining in said memory controller whether to one of:
   immediately execute said memory refresh request when said memory controller receives said memory refresh request; and
   delay an execution of said memory refresh request.

19. The method as set forth in claim 18 further comprising:

delaying an execution of said memory refresh request in said memory controller until an occurrence of a time slice identified by said data signal that comprises said memory refresh hint.

20. The method as set forth in claim 18 further comprising:
    delaying an execution of said memory refresh request in said memory controller until said memory controller receives a second data signal that comprises a second memory refresh hint.

21. The method as set forth in claim 16 wherein said periodic memory refresh hint unit is located within a bus arbiter coupled to said memory controller.

22. The method as set forth in claim 18 further comprising scheduling memory refresh requests in said memory controller to reduce memory access latency in scheduling memory transactions.

* * * * *

UNITED STATES PATENT AND TRADEMARK OFFICE
CERTIFICATE OF CORRECTION

PATENT NO. : 7,020,741 B1
APPLICATION NO. : 10/425564
DATED : March 28, 2006
INVENTOR(S) : Brett A. Tischler It is certified that error appears in the above-identified patent and that said Letters Patent is hereby corrected as shown below:

Colomn 12, Line 29 change "fresh" to --refresh--

Colomn 12, Line 1 change "fist" to --first--

Signed and Sealed this

Fifteenth Day of August, 2006

JON W. DUDAS
*Director of the United States Patent and Trademark Office*